United States Patent [19]  [11] 4,064,940
Sparlin  [45] Dec. 27, 1977

[54] WATER CONTROL WITH POLYMERS

[75] Inventor: Derry D. Sparlin, Ponca City, Okla.

[73] Assignee: Continental Oil Company, Ponca City, Okla.

[21] Appl. No.: 739,418

[22] Filed: Nov. 8, 1976

[51] Int. Cl.² ............................................. F02D 3/14
[52] U.S. Cl. ................................... 166/295; 61/36 C
[58] Field of Search ............... 61/36 C, 1 R; 166/295, 166/294, 273, 274, 275; 260/DIG. 14; 106/287 SS; 427/136; 71/64 SC; 252/8.55 D

[56] References Cited

U.S. PATENT DOCUMENTS

| 2,815,815 | 12/1955 | Hower et al. | 166/295 |
| 3,971,440 | 7/1976 | Hessert et al. | 166/294 |

Primary Examiner—Paul R. Gilliam
Assistant Examiner—Alex Grosz
Attorney, Agent, or Firm—Cortlan R. Schupbach, Jr.

[57] ABSTRACT

A method is provided for reducing the water permeability of a porous subterranean formation by injecting a dispersion of polyamide and a water soluble polymer through a well bore into the formation. Preferred materials are polyamides and poly-acrylamides.

6 Claims, No Drawings

WATER CONTROL WITH POLYMERS

The present invention relates to a method for reducing the permeability of water in a porous subterranean formation. More specifically, the present invention provides a means for reducing the permeability of water in a porous subterranean formation by preparing a dispersion of a polyamide in an aqueous polymer solution and injecting said dispersion through a well bore into a porous subterranean formation.

This invention relates to improving production rates of hydrocarbon producing wells by restricting the flow of water from water bearing zones. The invention also allows improved secondary recovery from hydrocarbon bearing zones by reducing the loss of injected water into aquifers or zones which contain lesser amounts of recoverable hydrocarbons thus diverting injected water into zones containing more recoverable oil.

Polymers such as polyacrylamides have been used for years to reduce the amount of water production from oil wells by means of injecting a solution of polymer into a subterranean formation thereby reducing the permeability of the formation to water. Representative examples of such techniques can be found in U.S. Pat. Nos. 3,749,172 and 3,893,510. Oil water ratios of oil and gas wells have been improved using such polymers as described in U.S. Pat. No. 3,087,543. Such polymers have also been used to change the injectivity profile of water injection wells to make more efficient use of the water and to change the mobility of said injected water.

These improvements, while important in contribution to the present state of the art, are not completely satisfactory. These polymers, while effective, have only limited lifetimes. Measurements of polymer being produced from wells after treatments such as described, have indicated that often 30 percent or more of the polymers is removed from the well by the produced or injected fluids. For example, a test well was treated with 1,400 barrels of an aqueous solution of a high molecular weight anionic polyacrylamide, and 350 barrels of a cross-linking agent followed by 100 barrels of water and 150 barrels of crude oil. Samples of the produced fluids from this test well after the treatment showed that 32% of the polymer came out of the well during the first 6 days. The use of a cross-linking agent in this treatment was an unsuccessful attempt to stabilize the polymer and to prevent its loss after the treatment.

Further indication of polymer instability is seen from results of treatments of producing wells over extended periods of time. It has been found that usually within 3 to 6 months the initial benefits of the polymer treatment have been lost. In other examples, one well that was producing 11 barrels of oil per day and 608 barrels of water per day before a polymer treatment was producing 12 barrels of oil per day and 291 barrels of water per day one week after the treatment. However, after 90 days the well produced 11 barrels of oil per day and water production increased to 529 barrels of water per day. A second well was producing 16 barrels of oil per day and 1,554 barrels of water per day prior to a polymer treatment. One month after the treatment, the well produced 47 barrels of oil per day and 200 barrels of water per day. After 3 months the well produced 21 barrels of oil per day and 700 barrels of water per day. After 6 months, the well was found to produce 16 barrels of oil per day and 1,500 barrels of water per day. Thus the final production rates very nearly approximated the original production of each well. Clearly then, the usefulness of the water soluble polymer treatments described in the prior art are of distinctly limited utility.

It is therefore an object of the present invention to provide an improved means for reducing the permeability of porous subterranean formations to water and to improve the stability and long term effectiveness of treatments of aqueous polymers. Further objects will become apparent to those skilled in this art as the description proceeds.

It has now been found in accordance with the present invention that long-term reduction of permeability of porous subterannean formations to aqueous fluid can be obtained by injecting, therein, a dispersion of a polyamide (nylon) in an aqueous polymer solution. Concisely, the present invention comprises preparing a dispersion of a polyamide in water or brine together with a water solution of a water soluble polymer. The dispersion is prepared by:

1. dissolving a polyamide in a solvent with heat and agitation until a true solution is obtained,
2. dissolving a water soluble polymer in water or brine with agitation until a true solution is obtained, and
3. combining the two solutions with agitation.

A polyamide/polymer dispersion thus prepared will contain polyamide particles having predominately 6 to 8 micron diameters which can remain dispersed without agitation for several days at room temperature. This dispersion can then be injected into a subterranean formation through a well bore where it will freely flow into the formation until the dispersed particles become trapped, adsorbed, or otherwise retained in the pores.

This invention has application in treatment of oil or gas producing wells where it is desired to reduce the production of water from said wells. The invention is also useful in water injection wells to reduce the injection of water into certain portions of the formation. This allows water diversion into other portions of the formation which contain higher levels of recoverable petroleum, including diversion of other injection or treating fluids such as polymers, plastics, brines, acids, and surfactants.

The polyamides useful in the present invention are any long chain polymeric amide which has recurring amide groups as an integral part of the main polymer chain. This includes both the thermoplastic and thermosetting, crosslinked or noncrosslinked, modified and unmodified polymers and copolymers. The most preferred materials are polyamides. These materials have excellent resistance to aqueous alkali solutions whether hot or cold, and to oxidation. These materials are normally soluble in phenols and lower aliphatic alcohols, particularly methanol and ethanol, with the aid of heat and agitation, and are insoluble in most other solvents including aliphatic and aromatic hydrocarbons, halogenated hydrocarbons, ketones, esters, carbon disulfide, and water. These materials can also contain coupling agents, wetting agents, coloring agents, antioxidants and other common materials while remaining effective in the method of the instant invention.

Polyamides particularly useful in the practice of the present invention are nylon 6 obtained by the polycondensation of caprolactam, nylon 66 obtained by the condensation of hexamethylene diamine with adipic acid, nylon 610 obtained by the condensation of hexamethylene diamine with sebacic acid, and elastic nylon, obtained by the condensation of sebacic acid with hexamethylene diamine and a minor amount of an alkyl substituted hexamethylene diamine. The most preferred polyamide is an alkylated alkoxy polyamide prepared by polymerization of adipic acid and hexamethylene diamine, alkoxylated with formaldehyde and alkylated with alcohol, producing a material having alkoxyalkyl side chains on a nylon 66 backbone structure.

Materials useful for making a solution of the polyamides are solvents such as lower straight chain alcohols, having from 1 to 8 carbon atoms. Isopropanol, ethylene glycol monobutylether and formic acid can be used to dissolve these materials at temperatures of 60° C to 90° C with agitation. Water up to approximately 40% by volume of the solvent can be added to the solution to improve the solubility of the nylon. However, water is not necessary and is not critical to the instant invention.

The concentration of polyamide in the solvent is not critical and can range between 10 ppm to about 30% by weight. Preferential ranges are between about 5% and about 30% by weight, with from 5 to 20% by weight the most preferred range. The polyamide will remain as a solution after cooling to room temperature and is stable indefinitely.

Water soluble polymers useful in the practice of the present invention are well known in the art. Examples of such polymers are cellulose ethers such as the various carboxyalkyl cellulose ethers, e.g. carboxyethyl cellulose and carboxymethyl cellulose (CMC); mixed ethers such as carboxyalkyl hydroxyalkyl ethers, e.g. carboxymethyl hydroxyethyl cellulose (CMHEC); hydroxyalkyl celluloses such as hydroxyethyl cellulose and hydroxypropyl cellulose; alkylhydroxyalkyl celluloses such as methylhydroxypropyl cellulose; alkyl celluloses such as methyl cellulose, ethyl cellulose, and propyl cellulose; alkylcarboxyalkyl celluloses such as ethylcarboxymethyl cellulose; alkylalkyl celluloses such as methylethyl cellulose; and hydroxyalkylalkyl celluloses such as hydroxypropylmethyl cellulose and the like. Many of said cellulose ethers are available commercially in various grades. The carboxy-substituted cellulose ethers are available as the alkali metal salt, usually the sodium salt. However, the metal is seldom referred to and they are commonly referred to as CMC, CMHEC, etc.

Also useful in the instant invention are polyalkoxylated organic materials such as the polyethoxylated and/or polypropoxylated aliphatic, aromatic, or alicylic alcohols, such as the natural gums or resins e.g., the Guar gums, carboxymethylcellulose, the polyacrylic acid esters, the polyvinyl esters or ethers, the polystyrl esters or ethers, or the like. Examples of commercially available materials include Neodols (polyethoxylated aliphatic alcohols available from Shell Chemical Company) Polyoxs (polyethylene oxide polymers available from Union Carbide) the Pluronics (comprising base units of polypropylene oxide with ions of polyethylene oxide tips, available from Wyandotte Chemical Company).

Further examples of useful water-soluble polymers are organic homopolymers, copolymers, terpolymers, etc, and chemically modified and/or chemically substituted (inorganic and/or organic substituted groups) products thereof. The polymers can have average molecular weights within the range of 500,000 to about 30,000,000 or more, preferably about 1,000,000 to about 25,000,000 and more preferably about 5,000,000 to about 20,000,000. The molecular weight used depends upon the permeability and rock properties of the reservoir to be flooded. Especially useful polymers are the polyacrylamides having about 0–70 percent of the carboxy amide groups hydrolyzed to carboxyl groups, e.g. fractionated Pusher polymers (Pusher is a trademark of Dow Chemical Company, Midland, Mich., U.S.A), the Pusher polymers are defined in U.S. Pat. No. 2,827,964 to Sandiford et al and U.S. Pat. No. 3,039,529 to McKennon. Other examples of useful polymers are defined in U.S. Pat. Nos. 2,842,492 to Engelhardt et al; 3,282,337 and 3,399,725 to Pye; and 3,679,000 to Kaufman. Sulfonated alkyl derivatives of acrylamide are also useful. Any polymer which effectively reduces the permeability of the formation rock to the flow of aqueous solution may be used with the present invention. Preferred polymers are polyacrylamides such as those described above.

Solvents for the water soluble polymers are usually water or brine, depending upon the compatibility of the particular polymer chosen, its ionic nature, and concentration of the solvent and polymer. Water soluble polymer concentrations can range from about 100 ppm to more than 5,000 ppm. Preferential polymer concentrations are between about 200 ppm and about 3,000 ppm. Small quantities of alcohols or oils are useful to aid in dissolving the polymer in the solvent, and to prevent formation of undissolved or partially dissolved particles of polymer.

The order of combining the polyamide solutions with water soluble polymer solutions is not critical, however, order of addition does affect the size of the polyamide agglomerates. It is preferred to slowly add the polyamide solution to the water soluble polymer solution. The resulting concentration of polyamide in the total solution can be from about 0.01 ppm to about 500 ppm but preferred ranges are between about 1 ppm and about 100 ppm.

Generally the ratio of polyacrylamide to polyamide ranges from about 30 to 1 to about 70 to 1, respectively. Preferred ranges are from about 40 to 1 to about 60 to 1 polyacrylamide to polyamide.

In the practice of the present invention the dispersion as described above is injected into a subterranean formation, preferably through a well bore, where it reduces the permeability of the formation to water, allowing the treated portion of the formation to be operated with greater effectiveness while retaining greater stability than either the water soluble polymers known in the prior art or polyamides alone.

The invention is more concretely described with reference to the following examples wherein all parts and percentages are by weight unless otherwise specified. It is emphasized that the examples are intended to illustrate the present invention and should not be construed to limit it in any fashion.

EXAMPLE 1

Six grams of a high molecular weight, non ionic polyacrylamide (Dowell, div. of Dow Chemical Company J217) were added to 90 ml of isopropanol followed by 3,000 ml of tap water. The mixture was stirred for one hour, left standing overnight, and filtered through a 200 mesh screen.

EXAMPLE 2

0.1 grams of polyamide (nylon No. 818 manufactured by Belding Chemical Industries) was dissolved in 90 ml of isopropanol by heating to 80° C. The mixture was allowed to cool to room temperature.

EXAMPLE 3

The solution prepared in Example 1 was added to the solution prepared in Example 2 in proportions of 60 to 1 polyacrylamide to polyamide by weight. This dispersion was stirred for one hour, allowed to stand overnight and filtered through a 200 mesh screen.

EXAMPLE 4

0.1 grams of polyamide as described in Example 2 was dissolved in 80 ml of isopropanol and 10 ml of tap water by heating to 60° C. The solution was allowed to cool to room temperature.

EXAMPLE 5

The solution prepared in Example 4 was slowly added to the solution prepared in Example 1 in proportions of 60 to 1 polyacrylamide to polyamide by weight. The dispersion was stirred for one hour, allowed to stand overnight, and filtered through a 200 mesh screen.

EXAMPLE 6

1 gram of polyamide as described in Example 2 was dissolved in 90 ml of isopropanol by heating to 80° C. The solution was allowed to cool to room temperature.

EXAMPLE 7

The solution prepared as described in Example 6 was slowly added to the solution of example 1 in proportions of 6 to 1 polyacrylamide to polyamide by weight. This dispersion was stirred for one hour, allowed to stand overnight, filtered through a 200 mesh screen.

The dispersion of example 3 contained mostly 6 to 8 micron size particles, but also contained larger cluster of particles, some of which were removed by the 200 mesh screen. The dispersion of Example 4 had very few clusters of particles larger than 10 microns. The comparison demonstrates the advantage of adding the polyamide to the polyacrylamide rather than the reverse.

The dispersion of Example 7 had an abundance of extremely large clusters of polyamide which were removed by the 200 mesh screen. Many particles or clusters larger than 10 microns remained dispersed in the polyacrylamide after filtering. This demonstrates that the ratio of polyamide to polyacrylamide was too high to obtain a good dispersion of useful small particles using this method and ratio of polymers.

EXAMPLE 8

A solution prepared as described in Example 2 was slowly added to tap water. The polyamide rapidly precipitated as a pliable solid polymer and would not disperse in the water. Most of this polyamide was retained on the 200 mesh screen when an attempt was made to filter the solution. This demonstrates that the polyamide would totally plug the sand or subterranean formation which could be detrimental to success of the well treatment since it could plug the hydrocarbon producing zone as well as the water bearing zone. Thus the present invention in one embodiment could be used to completely plug an isolated unwanted subterranean zone as opposed to only partial plugging of a zone as described in the preferred embodiments.

EXAMPLE 9

The polyacrylamide solution of Example 1 and nylon polyacrylamide dispersions of examples 3, 5, and 7 were tested using the following procedure.

Four packs of Oklahoma No. 1 sand were prepared, saturated with tap water, and contained in ⅜ inch (inside diameter) tygon tubes. These packs were placed in a Hassler sleeve test cell with 100 psi external air pressure and 15 psi air treating pressure. Tap water was passed through the sand pack and the permeability to water was measured. Treating solution (170 ml) was then injected and flushed with water (170 ml). The permeability to water was again measured. Additional volumes of treating fluid were injected through the core followed by tap water and measurements of the permeability to water repeated until all of the treating fluid sample had been used.

All three preparations (Examples 3, 4, and 7) were shown to be more effective in reducing the permeability of the sand packs than the polyacrylamide solution alone (example 1). Microscopic examination of the effluent from these tests showed an absence of dispersed polyamide, showing polyamide was adsorbed and/or trapped in the sand packs. Since the average pore size of the Oklahoma No. 1 sand pack is approximately 17 microns, the polyamide is apparently primarily retained by adsorption rather than entrapment since the smaller size of the polyamide would indicate that entrapment is unlikely. The polyamide thus aids retention of the polyacrylamide which provides greater stability to the treatment.

Tests results are shown in Table 1 below, which shows the results of the comparative tests as Darcies, a test well known to those skilled in this art.

TABLE 1

SAND PACK TREATMENT RESULTS

| Fluid | TREATMENT Cumulative Volume Throughput (ml) | Kw (darcies) | % of Initial Kw |
|---|---|---|---|
| Example 1 | — | 6.16 | — |
|  | 170 | 2.42 | 39.3 |
|  | 340 | 2.09 | 34.0 |
|  | 510 | 1.91 | 31.1 |
|  | 680 | 1.90 | 30.9 |
|  | 1,190 | 2.20 | 35.6 |
|  | 1,360 (after 24 hours) | 2.41 | 39.1 |
| Example 3 | — | 5.22 | — |
|  | 170 | 2.21 | 42.3 |
|  | 340 | 1.91 | 36.6 |
|  | 510 | 1.77 | 33.9 |
|  | 680 | 1.60 | 30.7 |
|  | 850 | 1.42 | 27.2 |
|  | 1,530 | .94 | 18.0 |
|  | 1,700 (after 24 hours) | 1.09 | 20.9 |
| Example 4 | — | 4.50 | — |
|  | 170 | 2.08 | 46.2 |
|  | 340 | 1.91 | 42.4 |
|  | 510 | .98 | 21.8 |
|  | 1,190 (after 24 hours) | 1.22 | 27.1 |
|  | 1,360 | 1.07 | 23.8 |
|  | 1,530 | .88 | 20.0 |
|  | 1,700 | .89 | 19.8 |
|  | 1,870 | .86 | 19.1 |
| Example 7 | — | 5.60 | — |
|  | 170 | 2.16 | 38.6 |
|  | 510 | 1.98 | 35.4 |
|  | 680 | 2.75 | 49.1 |
|  | 850 | 1.60 | 28.6 |
|  | 1,020 | 1.56 | 27.8 |
|  | 1,360 | 1.84 | 32.9 |
|  | 1,530 | 1.63 | 29.1 |
|  | 1,700 | 1.46 | 26.2 |

It will be apparent that the present invention provides a distinct advantage over the processes taught and used in the prior art in that a much more stable and efficient treatment of porous subterranean formations can be obtained without the disadvantages hitherto found using polyacrylamides alone.

While certain embodiments and details have been shown for the purpose of illustrating this invention, it will be apparent to those skilled in this art that various changes and modifications may be made herein without departing from the spirit or the scope of the invention.

I claim:

1. An improved method of treating a subterranean formation for reducing the flow of aqueous liquids therethrough by injecting a solution of polymer into said formation through a well bore, the improvement comprising injecting a dispersion of
   a. a thermoplastic or thermosetting cross-linked or non-cross-linked water-insoluble polyamide having recurring amide groups as an integral part of the main polymer chain, together with
   b. an aqueous solution of a water-soluble polymer, wherein
   c. the water-insoluble polyamide is dispersed in water in a concentration of from about 10 parts per million (ppm) to 30% by weight and the water soluble polymer in the aqueous solution is in a concentration of from about 100 ppm to about 5,000 ppm based on the total solution.

2. A method as described in claim 1 wherein the polyamide is selected from the group consisting of polyamides obtained by the condensation of hexamethylene diamine with adipic acid, condensation of hexamethylene diamine with sebacic acid, condensation of sebacic acid with hexamethylene diamine together with a minor amount of alkyl substituted hexamethylene diamine, and polycondensation of caprolactam.

3. A method as described in claim 1 wherein the water soluble polymer is selected from the group consisting of polyacrylamides, sodium carboxymethylcellulose, carboxyethyl cellulose and carboxymethyl cellulose (CMC), carboxymethyl hydroxyethyl cellulose (CMHEC), hydroxyethyl cellulose, hydroxypropyl cellulose, methylhydroxypropyl cellulose, methyl cellulose, ethyl cellulose, propyl cellulose, ethylcarboxymethyl cellulose, methylethyl cellulose, hydroxypropylmethyl cellulose, Guar gums, and carboxymethylcellulose.

4. A method as described in claim 1 wherein the dispersion is prepared by dissolving a polyamide in a solvent with heat and agitation until a solution is obtained, a water soluble polymer is dissolved in water or brine with agitation until a solution is obtained, and the two solutions are combined.

5. A method as described in claim 4 wherein the polyamide dispersion is added to the polyacrylamide solution.

6. A method as described in claim 4 wherein the ratio of polyacrylamide to polyamide is from about 30 to 1 to about 70 to 1.

* * * * *